United States Patent [19]

Perliski et al.

[11] Patent Number: 5,428,777
[45] Date of Patent: Jun. 27, 1995

[54] AUTOMATIC INDEX FOR YEARBOOKS WITH SPELL CHECKING CAPABILITIES

[75] Inventors: Frances P. Perliski, Dallas; Edward L. Hennigan, Plano; Howard Pennington, Grand Prairie; Mary T. Hyde, Coppell, all of Tex.

[73] Assignee: Taylor Publishing Company, Dallas, Tex.

[21] Appl. No.: 270,408

[22] Filed: Jul. 5, 1994

Related U.S. Application Data

[63] Continuation of Ser. No. 795,940, Nov. 18, 1991, abandoned.

[51] Int. Cl.⁶ .................. G06F 17/30; G06F 17/21
[52] U.S. Cl. .................. 395/600; 364/419.19; 364/419.12; 364/943.41; 364/943.5; 364/DIG. 2; 395/934
[58] Field of Search .................. 395/600; 364/419.12, 364/419.13, 419.19

[56] References Cited

U.S. PATENT DOCUMENTS 4,580,218 4/1986 Raye .................. 364/419.13

OTHER PUBLICATIONS

Fraser, Bruce, "Heavy-Duty FrameMaker: Muscle for Big DTP Jobs", *MacWEEK*, vol.: v4, Issue: n26, Jul. 31, 1990, pp. 84–87.
Kinata, Chris and McComb, Gordon, *Working With Word*, 2nd Edition, Microsoft Press (Redmond, Wash., 1989), pp. 177–181, 210–213, 502–511.

*Primary Examiner*—Thomas G. Black
*Assistant Examiner*—Paul R. Lintz
*Attorney, Agent, or Firm*—Baker & Botts

[57] ABSTRACT

An automatic indexing generation program generates an index from the text of a yearbook. Index entries are delineated using predetermined characters, such as brackets. A proof list is generated from the text and the proof list is edited as desired. The edited proof list is merged with a master list.

32 Claims, 6 Drawing Sheets

```
Page   Edit    Utility   Ship
------------------------------------------------

<Sherry Richardson>¶           Section: CLASSES
<Stacey Richard>¶              Page:    61
<Lenny Rocha>¶                 Block:   B
<Meridith Rodden>¶
<Connie Rua>¶                  COPY SPECIFICATIONS
<Angela Rushe>¶
                                   Kind: Panel
                               Typeface: ge
                                  Point: 08
                                Leading: 09
                                Pattern: In
                                Columns: 1
                               Balanced: No
                              Cap Style: Cic
                                  Width: 12
                                  Depth:
```

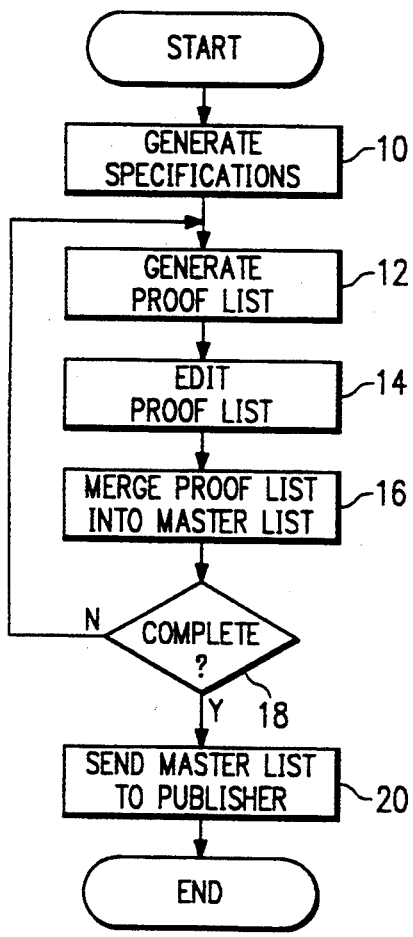
FIG. 1
FIG. 2a
Avery, Renee .................... 97, 138, 182
AWARDS ............................... 50, 51
Ayers, Andrea Lynn ..... 2, 82, 89, 190
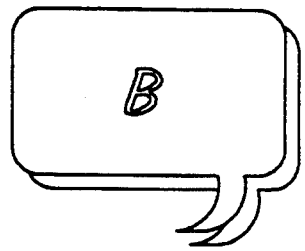
Baer, Michelle L. ... 102, 138, 145, 175
Bakken, Roseanne M. ............. 147, 182
Baldwin, Rhonda L. .......................... 182
FIG. 2b
Avery, Renee .................... 97, 138, 182
AWARDS ............................... 50, 51
Ayers, Andrea Lynn ..... 2, 82, 89, 190
Baer, Michelle L. ... 102, 138, 145, 175
Bakken, Roseanne M. ............. 147, 182
Baldwin, Rhonda L. .......................... 182
FIG. 2c
Avery, Renee .................... 97, 138, 182
AWARDS ............................... 50, 51
Ayers, Andrea Lynn ..... 2, 82, 89, 190
Baer, Michelle L. ... 102, 138, 145, 175
Bakken, Roseanne M. ............. 147, 182
Baldwin, Rhonda L. .......................... 182

FIG. 3a

```
Index  Print  Merge  Utility  Ship
Enter Edit ----------------------------------------
            Last         First      Middle     Nickname
            Birchfield   Robert     William    Bob Grade/Category:   SR Homeroom: 125
------------------------------------------------------
Page Numbers:
99, 25, 98, 122

------------------------------------------------------
Esc-Quit ; - -Next field ; -Select ; End-Save ; F3-Add ; TAB-Subject ;
```

FIG. 3b

```
Index  Print  Merge  Utility  Ship
Enter Edit Subject--------------------------------

Subject: Hair Affair

Category: AD

Sort Order: HAIR AFFAIR
------------------------------------------------------
Page Numbers:
311

------------------------------------------------------
Esc-Quit ; - -Next field ; -Select ; End-Save ; F3-Add ; TAB-Quick ;
```

```
 Page   Edit   Utility   Ship
------------------------------------------------------------
<Sherry Richardson>¶                Section:  CLASSES
<Stacey Richard>¶                      Page:  61
<Lenny Rocha>¶                        Block:  B
<Meridith Rodden>¶
<Connie Rua>¶                      COPY SPECIFICATIONS
<Angela Rushe>¶
                                       Kind:  Panel
                                   Typeface:  ge
                                      Point:  08
                                    Leading:  09
                                    Pattern:  In
                                    Columns:  1
                                   Balanced:  No
                                  Cap Style:  Clc
                                      Width:  12
                                      Depth:
```

AUTOMATIC INDEX FOR YEARBOOKS WITH SPELL CHECKING CAPABILITIES

CROSS REFERENCE TO RELATED APPLICATIONS

This application is a continuation of application Ser. No. 07/795,940 filed Nov. 18, 1991, entitled "*Automatic Index for Yearbooks with Spell Checking Capabilities*" by Frances P. Perliski, Edward L. Hennigan, Howard Pennington and Mary T. Hyde, now abandoned.

TECHNICAL FIELD OF THE INVENTION

This invention relates in general to publishing programs, and more particularly to a method of generating an index for a yearbook.

BACKGROUND OF THE INVENTION

At the end of each school year, schools across the country prepare the final versions of their yearbooks. Typically, the yearbooks are prepared in sections, so that much of the work is completed prior to the end of the final semester. However, a significant portion of the information, such as spring events, athletic accomplishments, and so on, cannot be finished prior to the end of the semester.

The yearbook index may reference the pages of the yearbook in relationship to students, faculty, student organizations, homerooms, advertising, etc. A thorough index references not only the occurrence of the students' names in the text of the yearbook, but will also reference each page upon which a photograph of the student or faculty member appears. Thus, a great deal of work is spent generating the index, a final copy of which cannot be completed until the body of the yearbook is finished.

Another problem in generating the yearbook is the proofing of the text. Heretofore, spell-checking programs have been an unacceptable aid in proofing the text because such a large portion of the yearbook text comprises students' names which are not part of the spell-checking software's dictionary. Since the spell-checking software will stop at each word not in its dictionary, use of the software is frustrating, and consequently, conventional spell-checking software is not used.

Because most schools have approximately the same year-end date, the yearbook staff of each school finishes the yearbook at approximately the same time. The page layout is sent to the publisher for production of the final copy. In order to timely fulfill the publishing requirements, it is advantageous to complete the yearbook as early as possible. Thus, it is important that the index and the text may be quickly and correctly generated.

Thus, a need has arisen for a reliable, efficient method of providing a yearbook index.

SUMMARY OF THE INVENTION

In accordance with the present invention, a method of generating an index is provided which substantially eliminates problems associated with the prior art.

In the present invention, a computer is used to generate an index from the text of a yearbook. The text is input into a computer file and index entries are delineated by the user. A proof list of unique index entries is generated from the text, along with the page number of each of the unique entries. The proof list is then merged with a master list. The spell-checking software ignores delineated names, thereby providing efficient spell-checking on the text. Errors in the spelling of names in the proof list are easily spotted.

The indexing system of the present invention provides significant advantages over the prior art. Subjects to be indexed may be delineated during entry, facilitating automatic generation of the index. Index entries, such as "J. Smith" and "John Smith", can be automatically correlated to produce a single index entry. Because of the automatic index generation, the time until final preparation of the yearbook is greatly reduced, thereby allowing the publisher increased time for completion of the published copy. Further, the accuracy of the list is greatly improved.

BRIEF DESCRIPTION OF THE DRAWINGS

For a more complete understanding of the present invention, and the advantages thereof, reference is now made to the following description taken in conjunction with the accompanying drawings, in which:

FIG. 1 illustrates a flow chart describing the major steps in automatically generating an index;

FIGS. 2a–c illustrate different alphabet separator styles which may be generated;

FIGS. 3a–c illustrate manual entry screens for imputing index information;

DETAILED DESCRIPTION OF THE INVENTION

Figure 3C:
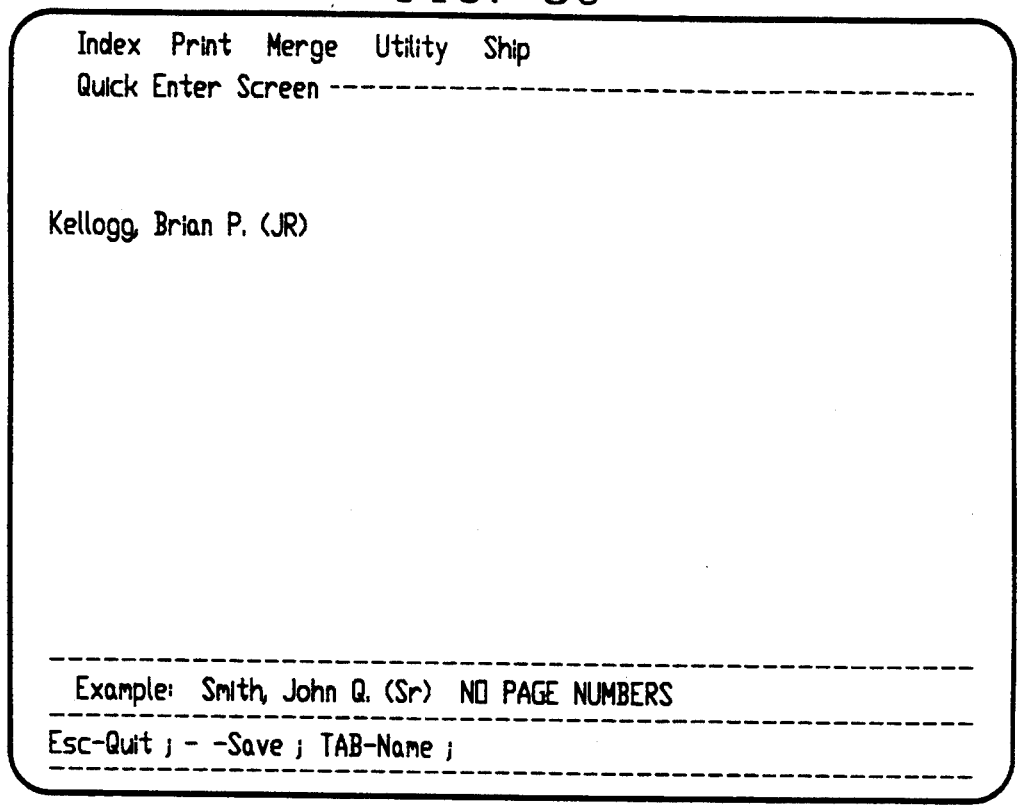

The preferred embodiment of the present invention and its advantages are best understood by referring to FIGS. 1–3 of the drawings, like numerals being used for like and corresponding parts of the various drawings.

The present invention efficiently generates an index from the text of a book. The present invention is particularly suited for generating an index in conjunction with the design and publication of school yearbooks. The automatic index generator allows an index to be built gradually during the design of the yearbook, because new names and page numbers are automatically alphabetized and added to the existing list each time the program is used. Special categories, such as seniors, advertisers or organizations can be specified during creation of the index; these categories can be set forth in a different type-face for emphasis.

Generation of the index involves two files or "lists". The "master" list is the most up-to-date and complete list throughout the generation process. The master list is updated via a "proof" list. Each time the master list is updated, the information is re-alphabetized and organized.

Broad Overview of the Automatic Index Generation Process

FIG. 1 illustrates the major steps involved in the automatic index generation process. The steps are implemented using a suitable computer including keyboard, display and printer. In block 10, specifications are generated to define the desired index features. In block 12, a proof list is generated; this text is edited in block 14. In block 16, the proof list is merged into the master list. In decision block 18, if the master list is complete, program control is transferred to block 20 wherein the master list is sent to the publisher, typically on a magnetic floppy disk. If the master list is not complete in decision block 18, program control returns to block 12 where additional proof lists are generated, edited, and merged into the master list.

Index Specifications

The index specification allows the yearbook editor to define the features regarding the overall appearance and organization of the index. In the preferred embodiment, the following features are defined during the specification generation process:

Type Face: Type faces are the different type design in which the index may be printed, and are also known as "fonts". Additionally, each type face may come in a variety of emphasis faces, such as bold, italic or bold/italic. Typically, one type face is used for the general index and different emphasis faces are used to draw attention to different categories, such as last name, clubs, advertisers, seniors, and so on.

Type Size: The type size is the height of a typeset character measured in points. Typically, type sizes will vary from six to fourteen points for the body of the index and between ten and sixty points for the alphabet separators, if used.

Leading: Leading is the amount of space between lines of type. Leading is also measured in points and is expressed as a fraction. The fraction's top number represents the type size and the bottom number represents the total line space, or leading. A "standard" leading is generally provided which allows a proportional amount of space between lines of type, based on the selected type size.

Column width: Column width is the line length in picas of each index column.

Alphabet Separators: Many indexes use alphabet separators to divide the list into small sections. Separators provide easy to find index entries and add visual interest to the page. In the preferred embodiment, three choices are provided: standard, index art, and own design. The standard separator uses a capitalized alphabet letter (A, B, C, etc.) to introduce the next part of the index. The separators are centered in each column. The type face and point size may be specified independently of the type face and type size of the general index. An example of a standard separator is shown in FIG. 2a.

Index art allows the user to designate index art from an index art library (supplied as part of the indexing program) to indicate the group of separators which will be used. FIG. 2b illustrates a exemplary sample of index art which could be provided. The "own design" option allows the yearbook editors to provide finished art for each letter of the alphabet. FIG. 2c illustrates an exemplary "own design" separator.

Index sequence: Index sequence is a structure by which entries are sorted and alphabetized. Typically, there are two index sequences: alphabetical by name and alphabetical by grade/category. If sorting by name, entries will be arranged in a straight alphabetical list, with other categories intermingled with the student names. If sorting by category, entries in the same category will be grouped together, then alphabetized.

Index style: The index style refers to the placement of lines of type in a block. Tables 1-7 illustrate different index styles.

TABLE 1

| Conventional/Justified/Fill with Space | |
| --- | --- |
| Nelson, Duane | 226 |
| Nelson, James | 226 |
| Nelson, Latonya | 226 |
| Nettles, Dan | 14, 53, 226 |
| Nettles, Jeanette | 227, 236 |
| Newberry, Lance | 55, 59, 76 |
|  | 84, 199, 227, 242 |
| Newell, Ryan | 227 |

TABLE 2

| Conventional/Justified/Fill with Dots | |
| --- | --- |
| Nelson, Duane . . . | 226 |
| Nelson, James . . . | 226 |
| Nelson, Latonya . . . | 226 |
| Nettles, Dan . . . | 14, 53, 226 |
| Nettles, Jeanette . . . | 227, 236 |
| Newberry, Lance . . . | 55, 59, 76 |
|  | 84, 199, 227, 242 |
| Newell, Ryan . . . | 227 |

TABLE 3

| Conventional/Flush Left |
| --- |
| Nelson, Duane 226 |
| Nelson, James 226 |
| Nelson, Latonya 226 |
| Nettles, Dan 14, 53, 226 |
| Nettles, Jeanette 227, 236 |
| Newberry, Lance 55, 59, 76 |
| 84, 199, 227, 242 |
| Newell, Ryan 227 |

TABLE 4

| Page Numbers Below Names |
| --- |
| Nelson, Duane |
| 226 |
| Nelson, James |
| 226 |
| Nelson, Latonya |
| 226 |
| Nettles, Dan |
| 14, 53, 226 |
| Nettles, Jeanette |
| 227, 236 |
| Newberry, Lance |
| 55, 59, 76, 84, 199, 227, 242 |
| Newell, Ryan |
| 227 |

TABLE 5

| Directory/Justified/Fill with Space | |
| --- | --- |
| Nelson, Duane | 226 |
| James | 226 |
| Latonya | 226 |
| Nettles, Dan | 14, 53, 226 |
| Jeanette | 227, 236 |
| Newberry, Lance | 55, 59, 76 |
|  | 84, 199, 227, 242 |
| Newell, Ryan | 227 |

TABLE 6

| Directory/Justified/Fill with Dots | |
| --- | --- |
| Nelson, Duane . . . | 226 |

TABLE 6-continued

Directory/Justified/Fill with Dots

| | |
|---|---|
| James . . . | 226 |
| Latonya . . . | 226 |
| Nettles, Dan . . . | 14, 53, 226 |
| Jeanette . . . | 227, 236 |
| Newberry, Lance . . . | 55, 59, 76 |
| | 84, 199, 227, 242 |
| Newell, Ryan . . . | 227 |

TABLE 7

Directory/Flush Left

Nelson, Duane 226
James 226
Latonya 226
Nettles, Dan 14, 53, 226
Jeanette 227, 236
Newberry, Lance 55, 59, 76
84, 199, 227, 242
Newell, Ryan 227

Second Line Indentions: The user may wish to indicate an indention for entries that flow onto a second line for Flush-Left (Tables 3 and 7) or Page Number Below Names (Table 4) index styles. Indentions make the index easier to read. The degree of indention is specified as a number of spaces.

Index Generation

In the preferred embodiment, the present invention allows the index to be built in several ways: by typing the master list and page numbers manually; by typing the master list manually and merging entries found in a search of the yearbook text to add page numbers; by using a search of the yearbook text to create a proof list of names with page numbers; or by a combination of any of the above options.

To create an index by manual entry, records are entered by each student in a form (provided on a computer screen) similar to one shown in FIG. 3a. Each record includes fields pertaining to a variety of information for each student (advertiser, clubs, and other subjects are handled by another form), such as first, last and middle names, nicknames, grade/category, homeroom, and page numbers upon which the student appears. The records for each index subject may be updated as desired. An alternative entry screen for subjects other than students is shown in FIG. 3b.

A quick entry screen, shown in FIG. 3c, may also be used in order to expedite entry in the master list. A quick entry screen is for personal names only, and allows the user to enter the last name, first name, middle name and grade/category all at once, without moving from one part of the personal screen to another. The quick entry screen is efficiently used by typing the complete master list manually, then using the automatic indexing features to add page numbers. In this way, the user can go back to add nicknames and homeroom numbers to the master list.

In the present invention, however, a significant increase in efficiency can be accomplished by using automatic indexing procedures which build an index automatically from the yearbook text. The automatic index generation may be used either alone to build the entire index, or combined with a previously entered master list to add the page numbers as they are found in the text. Flow charts describing the operation of the automatic indexing function are shown in FIGS. 4a–b.

Figure 4A:
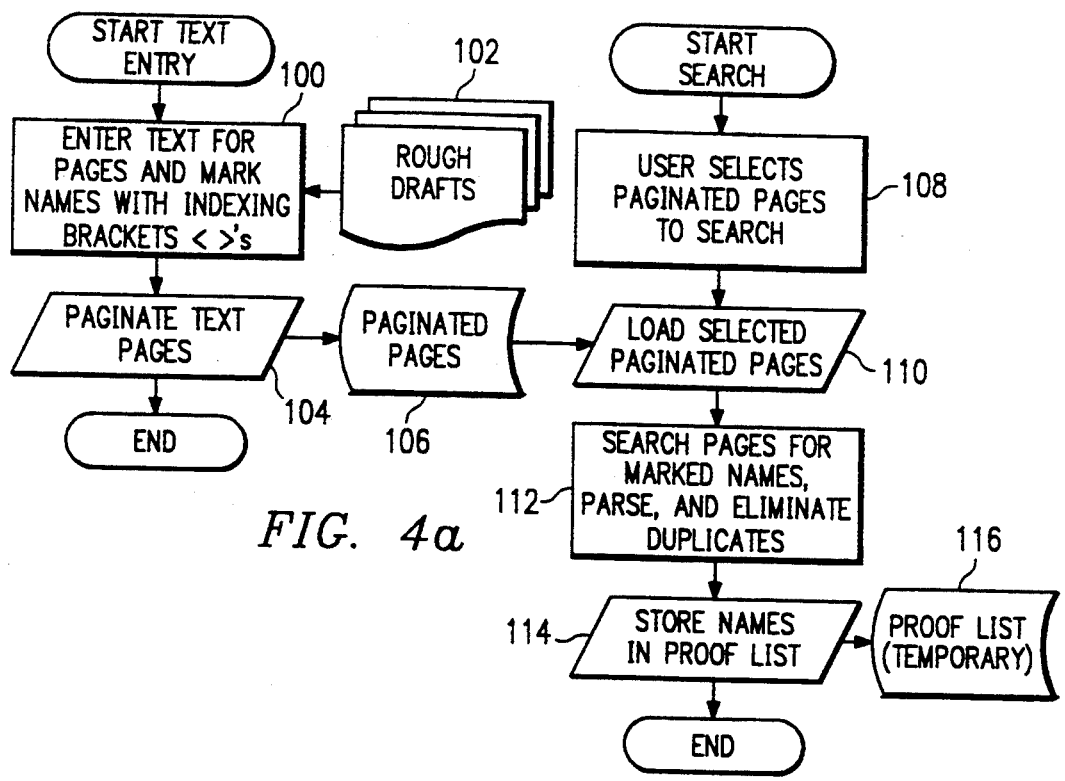
FIGS. 4a–b illustrate flow charts describing operation of the automatic index generation process.

In FIG. 4a, the text for the yearbook is entered into the computer in block 100, based on the rough drafts of the yearbook pages 102. Automatic indexing may be applied to any type of word processing files; however, in the preferred embodiment for yearbooks, a dedicated word processor such as TYPE VISION PLUS from Taylor Publishing Company of Dallas, Texas is recommended. During the process of entering the yearbook text, index entries are delineated using brackets such as "<" and ">" or other identifiable symbols which typically would not be used in the text for another purpose. Groups of index entries may be surrounded by double brackets "<<" and ">>", or other identifiable markers, with the enclosed index entries separated by commas and the words "and" or "or". The text is paginated in block 104 to produce paginated pages 106. Although not explicitly shown in FIG. 4a, the text may be edited and repaginated a number of times.

In block 108, the user selects which of the paginated pages 106 will be searched for index entries. In block 110 the selected pages are loaded into the computer and, in block 112, the text on the selected pages is searched for delineated index entries. Duplicate entries are eliminated. As index entries are found, they are parsed (fragmented) into their smallest components and, in block 114, stored into a proof list 116.

Figure 4B:
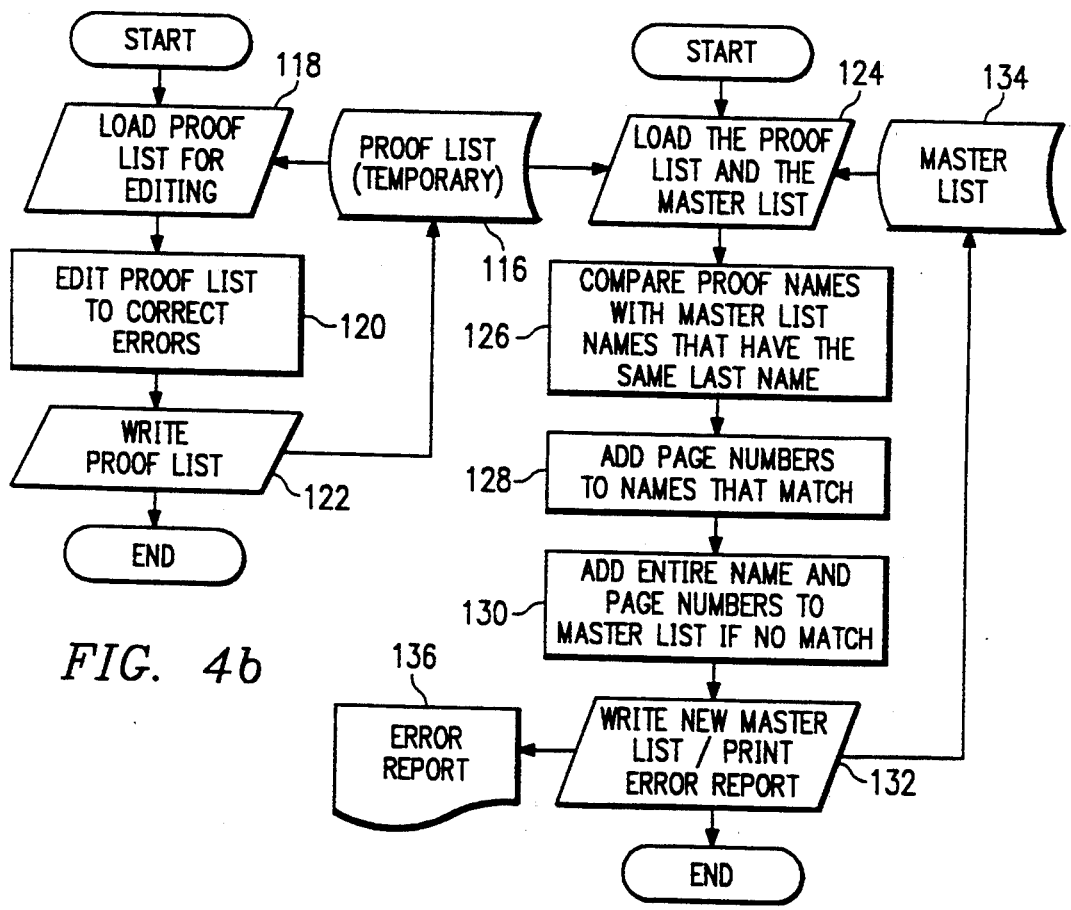

FIG. 4b illustrates a flow chart describing additional processing of the index. In block 118, the proof list 116 is loaded into the computer for editing. In block 120, the proof list is edited by the user to correct obvious errors. In block 122, the edited proof list is stored in a computer file.

Blocks 124–132 illustrate the merging of the proof list into index master list 134. In block 124, the proof list 116 and master list 134 are loaded into the computer from their respective computer files. The index entries from the proof list 116 are compared to the index entries in the master list 134 having the same last name in block 126. In block 128, where matching entries are found, page numbers from the proof list are added to the master list. In block 130, where index entries from the proof list 116 do not match an index entry in the master list 134, both the name and page numbers are added to the master list 134. In block 132, the master list is stored in a computer file and an error report 136 is generated.

The error report 136 lists index entries which cannot be merged from the proof list to the master list. Typically, this will occur if an entry from the proof list matches more than one name on the master list. This can occur if there are two or more people with the same name on the master list. For example, if "Susan L. Wilson" and "Susan A. Wilson" are on the master list 134, but in the yearbook copy, only "Susan Wilson" is identified on page 100, the automatic indexing program cannot accurately match the "Susan Wilson" on page 100 to either entry on the master list. The user may add page 100 to the entry on the master list as described hereinabove, or the proof list may be edited and remerged.

In order to match index entries, a range of check points are analyzed. First, entries are organized alphabetically by last name or subject name, and duplicates are combined. Second, the automatic indexing program attempts to match entry by first name, middle name and nick name. Duplicates are merged. Finally, entries with initials for first, middle or nick names are matched and merged. If one or more variables agree, the match is accepted and the entry is indexed. For example, if a master list entry is entered with the last name "Jones"

first name "Charles" middle name "Lee" and nickname "Skip" all of the following variations of the name would be matched from the proof list to the master list entry: "Charles Jones" "CHARLES JONES" "Charles Lee Jones", "C. Lee Jones", "Lee Jones", "Jones, C. Skip" "C. Jones" "C. Jones" "L. Jones" "C.L. Jones" "Skip Jones" "C. Skip Jones" "C L Jones" "Jones, Charles", "Jones, L.", "Jones, C.L.", "Jones, Skip" and "Charles (Skip) Jones".

In order to accurately match names as described hereinabove, it is important to conform to some rules in entering the names. For example, the first and middle initials should be typed with a space between them. Hence, "CL Jones" is incorrect whereas "C L Jones" is correct. Third and fourth names, such as "Jr." or "III" should be left outside the markers; otherwise, the "Jr." could be mistaken for the last name. If a last name is entered first in the yearbook copy, it should be followed by a comma to indicate it is the last name–for example "Jones, Charles". Names with two parts, such as Van Buren, should be connected with a predetermined marker such as a caret "+", so that the name will be read as one name rather than two.

Figures 5A, 5B:
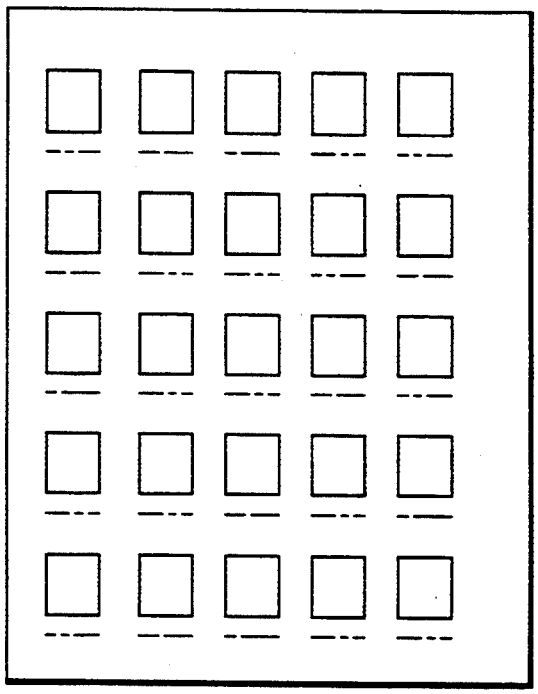
FIG. 5a illustrates a panel page.
FIG. 5b illustrates a input screen for entering index entries into a panel copy block, such that the index entries may be retrieved using the automatic index generation process.

By using a word processor specifically for yearbooks, such as TYPE VISION PLUS, the efficiency of the automatic indexing function can be enhanced. For example, the names for panel picture pages (such as are shown in FIG. 5a) may be entered in a special type of copy block, such that their names will be accessible to the automatic indexing program. Because each entry in the panel copy block will be an index entry, the markers may be automatically placed around each name by the program. An example of a panel name block entry screen is shown in FIG. 5b. Also, a folio (words that go along with each page number telling the reader what is on the page) can be made accessible to the automatic indexing program to provide indexing of the folio.

Figure 6:
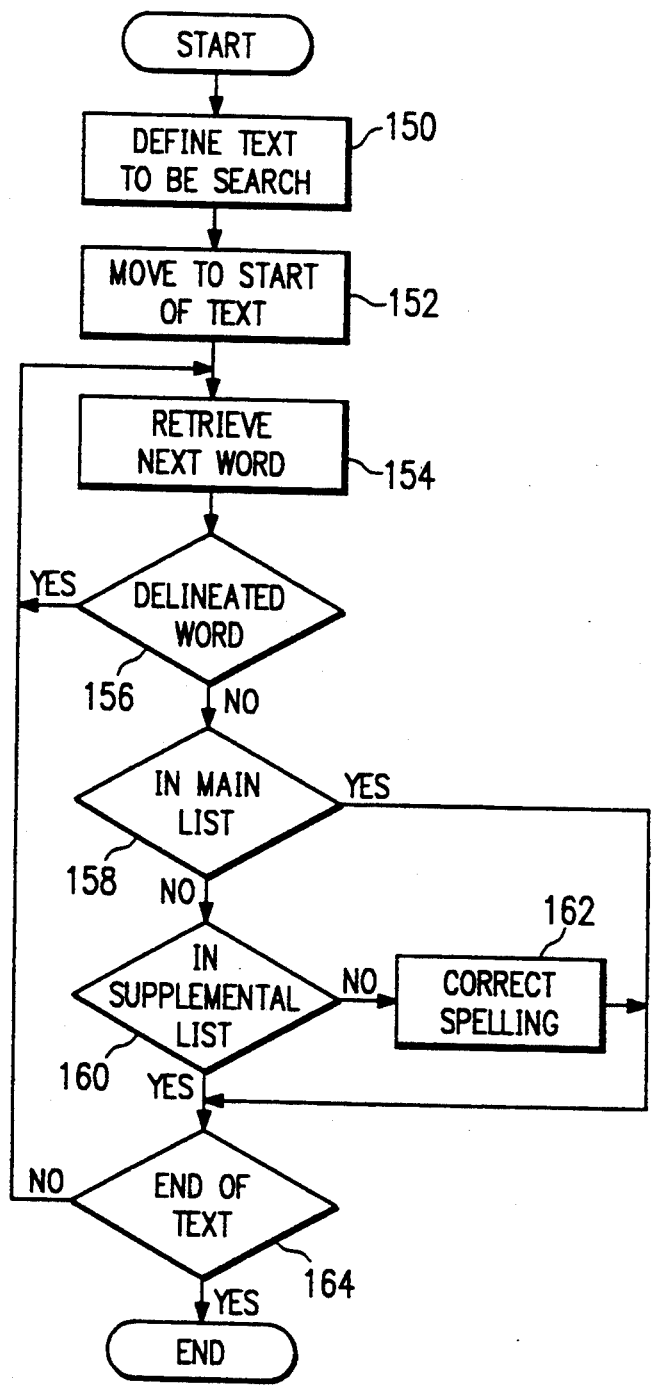
FIG. 6 illustrates a flow chart describing the spell checking feature of the present invention.

The procedures described above for automatically generating an index allow a very efficient spell-checking software to be implemented, as described in connection with FIG. 6. In block 150, the portion of the text to be spell-checked is defined, typically by page number. The beginning of the defined portion of the text is found in block 152. In block 154, the next word (at this stage of the program, the "next" word is the first word in the defined portion of the text) is retrieved from the text. If the retrieved word is a delineated word, it is not spell-checked, and the next word is retrieved in block 154. Hence, the spell checking program will not stop on each proper name, which would make the use of the spell checking program unacceptable in the context of a yearbook. If the word is not delineated, it is compared to words in a "main" list in decision block 158. The main list is a file of correctly spelled words which is supplied by the vendor of the software. If the word is not in the main list, program flow continues to block 160 where the word is compared to words in a supplementary list or file which contains words supplied by the user. For example, if the school's team name is the "Fightin' Tigers" the word "Fightin'" would not show up in the main file, but could be added to the supplemental file as a correctly spelled word. It should be noted that a single file could also be used in place of the main and supplementary lists.

If the retrieved word is not in either the main or supplemental lists, program control flows to block 162, where the spelling of the word may be corrected. The user may choose from several options: (1) to edit the word manually, (2) to choose from a list of similarly spelled words, (3) to skip the word once, (4) to skip all words in the defined portion of text having the same spelling or (5) to add the word to the supplemental dictionary.

After correction of the word in block 162 or if the word is found in the main or supplemental list, decision block 164 causes the program to retrieve the next word in block 154, unless the end of the defined portion of text is reached.

Names which are not delineated are caught by the spell checking program, and can be properly delineated in block 162. Incorrectly spelled delineated names will generally be easily spotted in the proof list 116. Furthermore, if the students' names are categorized by class, the seniors in the master list may be deleted each year, leaving the names of the returning students. Thus, only the incoming students need be added to the master list, reducing the chances for error in regenerating an entire index. Faculty names may be added to the supplemental list for spell checking.

Figure 7:
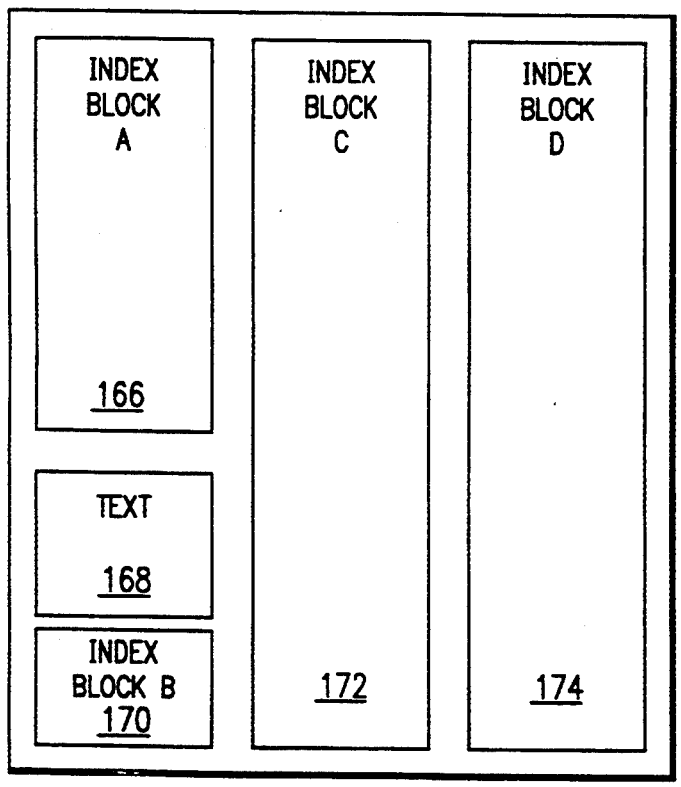
FIG. 7 is a diagram of a page layout of a yearbook or the like, illustrating manipulation of text and index blocks.

FIG. 7 illustrates index blocks, which allow the index to wrap around other blocks inserted within the index pages, such as advertisements, text and pictures. FIG. 7 shows a page having an index block A 166, a text block 168, and index block B 170, index block C 172 and index block D 174. The index blocks are labelled to define the flow of index entries. For example, if index entries are added to the beginning of the index, entries formerly in index block A will flow into index block B. Index entries will continue to ripple from index block B to index block C and so on without affecting the text block. Another example would be changing the parameters of the index to fit within a set number of pages. While the size and number of the index entries within each block would change, the text would be unaffected.

Although the preferred embodiment of the present invention has been described in detail, it should be understood that various changes, substitutions and deletions could be made herein without departing from the spirit and scope of the invention as defined by the appended claims.

What is claimed is:

1. A method of using a computer to generate a yearbook, comprising the steps of:
   inputting text into a computer file;
   delineating portions of the input text during said input step such that the delineated portions function as viewable text and further function as index entries;
   generating a list of index entries and associated page numbers from the input text;
   automatically matching and combining predetermined variations of index entries in said list to create a list of unique index entries; and
   verifying the spelling of that portion of the input text which is not delineated as index entries.

2. The method of claim 1 wherein said verifying step comprises the step of comparing only non-delineated words against a list of properly spelled words in one or more files, such that the proper spelling of the delineated index entries is not verified.

3. The method of claim 2 wherein said one or more files include a main file having a predetermined set of words stored therein and a supplementary file having user definable words stored therein.

4. The method of claim 1 and further comprising the step of defining a portion of text to be verified.

5. The method of claim 1 and further comprising the step of allowing a user to correct the spelling of a misspelled word.

6. The method of claim 5 wherein said step of allowing the user to correct the spelling of a word comprises generating a list of words having similar spelling to a misspelled word.

7. The method of claim 1 and further comprising the step of generating an index from the delineated index entries.

8. The method of claim 7 wherein said generating step comprises the step of generating a list of unique index entries and associated page numbers from said delineated index entries.

9. The method of claim 1 wherein said delineating step comprises the step of delineating each index entry with one or more predetermined characters.

10. The method of claim 9 wherein said delineating step comprises the step of delineating a group of index entries with one or more predetermined characters.

11. The method of claim 1 wherein said step of automatically matching and combining predetermined variations of index entries in said list to create a list of unique index entries further comprises the steps of:
organizing said index entries alphabetically by a predetermined portion of each said index entry; and
combining duplicate index entries identified in said organizing step according to at least one of a second or third portion of each said index entry.

12. Circuitry for generating a yearbook, comprising:
circuitry for inputting text into a computer file;
circuitry for delineating portions of said input text during said input step such that the delineated portions function as viewable text and further function as index entries;
circuitry for generating a list of index entries and associated page numbers from the input text;
circuitry for automatically matching and combining predetermined variations of index entries in said list to create a list of unique index entries; and
circuitry for verifying the spelling of that portion of the input text which is not delineated as index entries.

13. The circuitry of claim 12 wherein said verifying circuitry comprises circuitry for comparing only non-delineated words against a list of properly spelled words in one or more files, such that the proper spelling of the delineated index entries is not verified.

14. The circuitry of claim 13 wherein said one or more files include a main file having a predetermined set of words stored therein and a supplementary file having user definable words stored therein.

15. The circuitry of claim 12 and further comprising circuitry for defining a portion of text to be verified.

16. The circuitry of claim 12 and further comprising circuitry for allowing a user to correct the spelling of a misspelled word.

17. The circuitry of claim 16 wherein said circuitry for allowing the user to correct the spelling of a word comprises circuitry for generating a list of words having similar spelling to a misspelled word.

18. The circuitry of claim 12 and further comprising circuitry for generating an index from the delineated index entries.

19. The circuitry of claim 18 wherein said generating circuitry comprises circuitry for generating a list of unique index entries and associated page numbers from said delineated index entries.

20. The circuitry of claim 12 wherein said delineating circuitry comprises circuitry for delineating each index entry with one or more predetermined characters.

21. The circuitry of claim 20 wherein said delineating circuitry comprises circuitry for delineating a group of index entries with one or more predetermined characters.

22. The circuit of claim 12 wherein said circuitry for automatically matching and combining predetermined variations of index entries in said list to create a list of unique index entries further comprises:
circuitry for organizing said index entries alphabetically by a predetermined portion of each said index entry; and
circuitry for combining duplicate index entries identified in said organizing step according to at least one of a second or third portion of each said index entry.

23. A method of using a computer to generate a text of a yearbook, comprising the steps of:
inputting the text of the yearbook into a computer file;
inputting index entries in a panel block which automatically delineates all such text as separate index entries;
delineating portions of the yearbook text during said input step such that the delineated portion functions as viewable text in the yearbook and further functions as index entries;
generating a list of unique index entries and associated page numbers from the yearbook text; and
verifying the spelling of that portion of yearbook text which has not been delineated as index entries.

24. The method of claim 23, wherein said verifying step comprises comparing non-delineated words to correctly spelled words in one or more files.

25. The method of claim 23, wherein said verifying step comprises the step of comparing each non-delineated word to a file of properly spelled words.

26. The method of claim 23 wherein said delineating step comprises the step of delineating each index entry with one or more predetermined characters.

27. The method of claim 23 and wherein said step of delineating comprises the step of delineating a group of index entries with one or more predetermined characters.

28. The method of claim 23 wherein said step of inputting text includes the step inputting index entries in a panel block.

29. The method of claim 23 and further comprising the step of manually generating a list of index entries and associated page numbers to be merged with the generated index entries and page numbers.

30. The method of claim 23 and further comprising the step of merging the list of unique index entries and associated page numbers into a master index list.

31. The method of claim 30 and further comprising the step of allowing the user to edit the list of generated index entries and associated page numbers prior to merging.

32. A method of using a computer to generate a text of a yearbook, comprising the steps of:
inputting the text into a computer file;
delineating portions of the input text during said step of inputting the text such that the delineated portions function as viewable text and further function as index entries;

generating automatically a list of index entries and associated page numbers from the text;

comparing and matching automatically the generated index list of index entries with a master index list;

updating the master index list by automatically adding page numbers to the master index list for index entries of the generated index list that match index entries of the master index list;

updating the master index list by automatically adding index entries and associated page numbers to the master index list for index entries of the generated index list that do not match index entries of the master index list and by automatically reorganizing the master index lists;

generating automatically an error list identifying index entries of the generated index list that match more than one index entry of the master index list during the updating of the master index list.

* * * * *